Jan. 22, 1963  E. I. SCHEFER  3,074,299
SWAGE PLATE
Filed Oct. 22, 1958  2 Sheets-Sheet 1
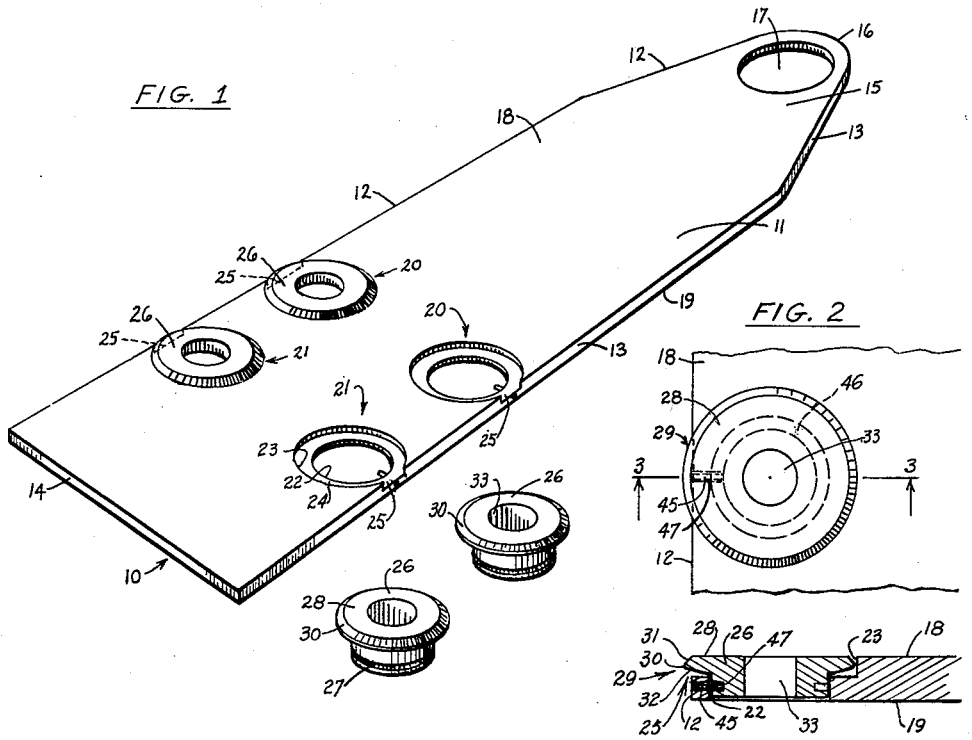
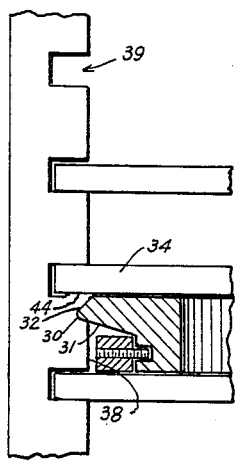
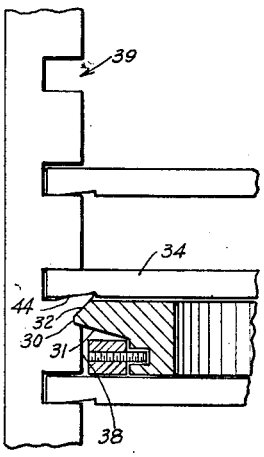
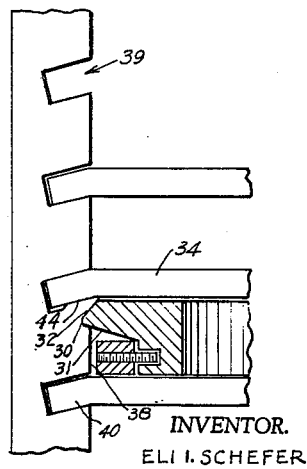
INVENTOR.
ELI I. SCHEFER
BY *Kenyon & Kenyon*
ATTORNEYS Jan. 22, 1963     E. I. SCHEFER     3,074,299
SWAGE PLATE
Filed Oct. 22, 1958     2 Sheets-Sheet 2
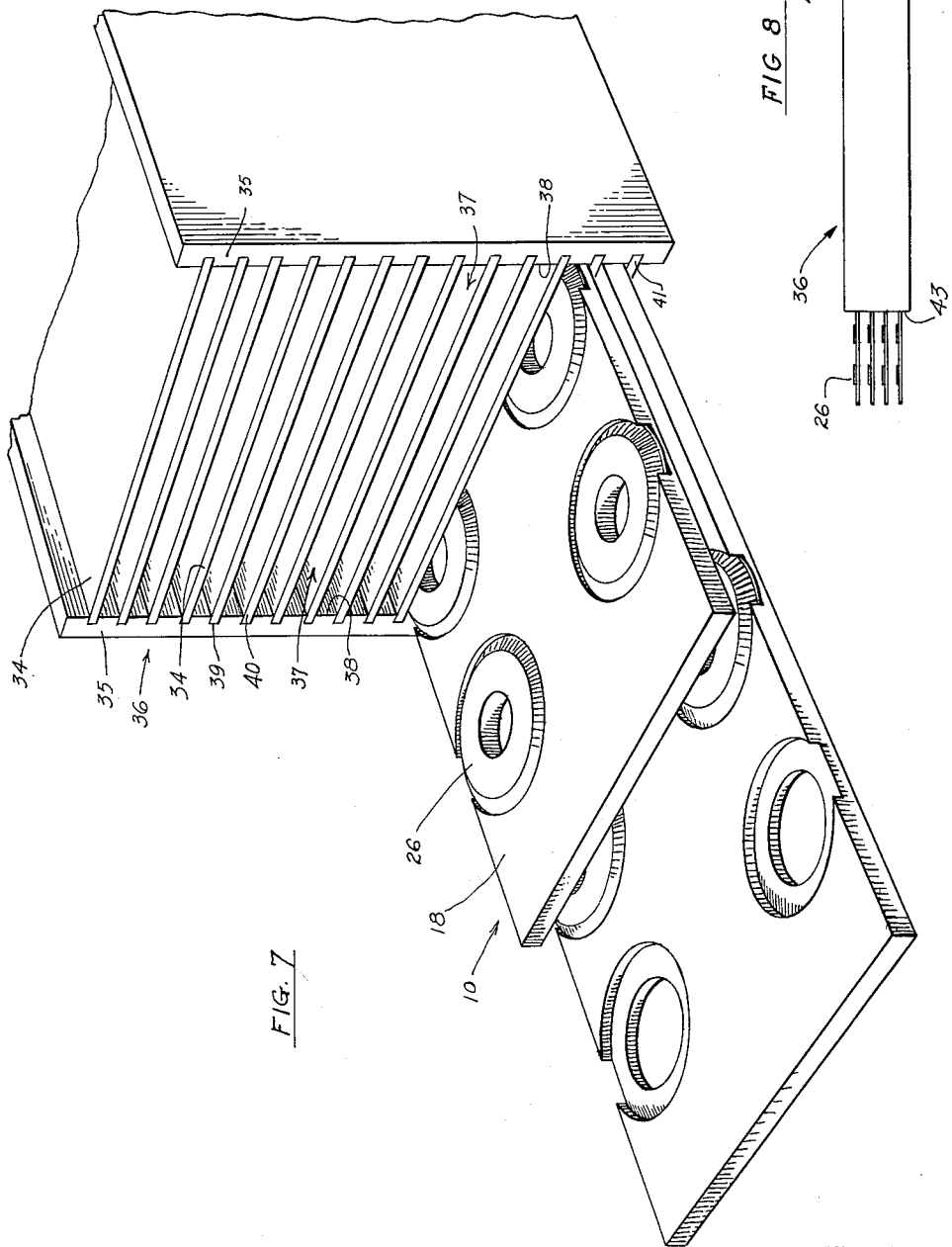
INVENTOR.
ELI I. SCHEFER
BY
*Kenyon & Kenyon*
ATTORNEYS

3,074,299
SWAGE PLATE
Eli I. Schefer, Plainview, N.Y., assignor, by mesne assignments, to Sylvania Electric Products Inc., a corporation of Delaware
Filed Oct. 22, 1958, Ser. No. 768,931
5 Claims. (Cl. 80—1)

This invention relates to apparatus for joining fuel plates to the side supporting members in a plate type nuclear reactor fuel assembly, and to a method for constructing such an assembly.

Nuclear reactors generally contain a number of fuel assemblies which are made separately and then mounted in a group within the reactor for use. Such fuel assemblies may be of the plate type, consisting of individual fuel plates held in a spaced overlying relationship relative to one another by supporting members at their edges. The spaces between the fuel plates serve as passageways for a cooling or heat transfer fluid such as water. The fuel plates are made of a protective material, for example aluminum, which surrounds an inner layer of fissionable material such as uranium. The fuel plates may be flat or curved and of any shape, but in general they are long, narrow and thin and of a rectangular configuration.

There have been many problems in the manufacture of plate type nuclear fuel assemblies. Fuel plates have been attached to the side supporting members by brazing, an operation which is not only time consuming and expensive, but one which is susceptible of producing uncontrollable gaps and voids in the weld. Such voids may entrap flux materials such as lithium and the like which in some forms act as neutron absorbers and consequently the operability of the fuel plate in the assembly may be thereby impaired or even destroyed.

Furthermore, the relatively expensive fuel plates are often warped by the heat of the brazing operation, and at the same time the kind of joining effected by the brazing makes salvage of the undamaged elements from a faulty assembly difficult if not impossible.

An object of the present invention is to provide apparatus which makes it possible to lock all of the fuel plates of a nuclear reactor fuel assembly in the position by upsetting or swaging metal against them from the side supporting members in one operation.

Another object is to provide proper alignment of all the fuel plates in the assembly prior to their being affixed to the side members.

A further object is to provide for automatic positioning or indexing of the swaging rollers in relation to the fuel plates and to the side members during the swaging operation.

Still another object is to provide support for the fuel plates while they are being joined to the side supporting members.

An additional object is to provide a swaging tool for joining nuclear reactor fuel plates to side supporting members in a fuel assembly, which is of simple construction, rugged and of reasonable cost.

Briefly, the principles of the present invention are directed to a swage plate or slide particularly adapted for the manufacture of plate-type neutronic reactor fuel assemblies and comprising in one embodiment an elongated flat rectangular slide or swage plate which is appropriately dimensioned for sliding passage through a cooling fluid gap of a nuclear reactor fuel assembly between adjacent overlying fuel plates thereof with preselected minimum tolerances for said passage. The slide has a plurality of stepped circular recesses in its top surface disposed along each of its side edges in fore and aft relation.

Each of the recesses has an upper larger diameter portion which overlaps the respective side edge of the slide to provide an opening along such edge for a distance less than the diameter of the larger diameter portion and to the depth of said portion. A swaging roller is rotatably disposed in each recess without mechanical connection to the slide, being retained in the recess by gravity. Each roller has a cylindrical lower body portion and an upper radially extending peripheral rim which seats in its respective recess with an exposed arc portion thereof extending beyond the side edge of the plate through the respective opening therein. The recesses along each side are so disposed relative to one another that the extent of overhang of the rims of the rollers beyond the edge of the slide is proportioned to the distance of the rollers from the front end of the slide. In other words, the extent of such overhang is proportionately greater for the rollers farther from the front end.

The rollers are further maintained in their recesses during use, i.e. during passage of the slide through the cooling fluid gap of the fuel assembly, by the adjacent fuel plate of the assembly overlying the slide, and the rollers are rotatable during such passage to provide swaging action on the surface of the side supporting members of the assembly encountered by the exposed portions of the rollers.

Other objects and features of the invention will become apparent in the following specification and claims, and in the drawings in which:

FIG. 1 is a perspective view of one embodiment of the invention;

FIG. 2 is an enlarged plan view of a portion of the structure shown in FIG. 1;

FIG. 3 is a section taken along lines 3—3 of FIG. 2;

FIG. 4 is an enlarged fragmentary elevation showing the operative position of a swaging roller with respect to one form of fuel assembly;

FIG. 5 is an enlarged fragmentary elevation showing the operative position of a swaging roller with respect to another form of fuel assembly;

FIG. 6 is an enlarged fragmentary elevation showing the operative position of a swaging roller with respect to another form of fuel assembly;

FIG. 7 is a fragmentary perspective view of a fuel assembly with swage plates partially inserted into the cooling fluid gaps thereof; and FIG. 8 is a reduced side elevation showing swage plate assemblies in position to be drawn through a fuel assembly.

Referring to FIG. 1, one embodiment of the invention is shown and is referred to generally by the reference numeral 10. It is comprised of an elongated flat slide or swage plate 11 having a pair of opposed sides 12, 13 and a back or rearward end 14 defining a generally rectangular shape. At the front or forward end portion 15 the slides 12, 13 are tapered inwardly to a curved end 16 adjacent which is a hole 17 extending through the slide from the top surface 18 to the bottom surface 19.

At an intermediate portion of the slide 11 in the top surface 18 thereof, and along sides 12, 13 are respective pairs of stepped circular recesses 20, 21 disposed in fore and aft relation relative to one another. Each recess has a lower bore or smaller diameter portion 22 and an upper counterbore or larger diameter portion 23 defining a shoulder 24 disposed intermediate of the top and bottom surfaces 18, 19 respectively. The upper larger diameter portions 23 overlap the respective side edges 12, 13 to provide elongated openings 25 along such edges for a distance less than the diameter of said larger diameter portions 23 and to the depth of said portions as shown in FIGS. 1 and 3.

Rotatably disposed within each of said recesses 20, 21 is a swaging disc or roller 26 having a cylindrical lower body portion 27 received by the bore 22 of the recess, and an upper radially extending peripheral rim portion 28 received by the counterbore 23 and seating on the shoulder 24. An exposed arc portion 29 of the rim 28 extends through opening 25 beyond the respective side edge 12, 13 of the plate 11. (See also FIG. 2.)

Each swaging roller 26 is dimensioned to fit snugly within its particular recess, so that it may be rotatable with virtually no lateral shifting of its axis. The outer working edges 30 of the rollers 26 have upper and lower tapered surfaces 31, 32 of a preselected degree to provide swaging action in use as desired. The rollers are also provided with central bores 33 to permit easy handling thereof.

The swage plate or slide 11 may be made of any suitable metal such as rolled steel or the like and the swaging rollers may be made of, for example, tool steel having a Rockwell C hardness of about 57 to 60. When the apparatus is to be used for swaging fuel plates 34 to the side supporting members 35 of a nuclear reactor fuel assembly 36 as shown, for example, in FIGS. 7 and 8, the slide is dimensioned for insertion into, and sliding passage through, the water gaps 37 of the assembly with minimum tolerances in both vertical as well as horizontal dimensions. The lateral dimension or width of the slide 11 is such that rollers 26 will encounter or cut into the inner surfaces 38 of the side supporting members 35 (see FIGS. 4, 5 and 6), during passage of the slide through a water gap 37, and thereby swage the metal of the side supporting members upwardly against the underside of the adjacent overlying fuel plate 34. Because of the close tolerances the slide is in effect self-indexing relative to the water gap 37 and consequently the swaging rollers are automatically disposed with respect to the assembly once the forward portion 15 of the slide 11 has been inserted into the water gap 37. In addition, the slides 11 provide support for the fuel plates during the swaging operation to prevent buckling or distortion of the plates due to the varying stresses which may be created therein by the swaging pressure.

In the manufacture of a fuel assembly, the fuel plates 34 and side supporting members 35 are made in any well known fashion and are fashioned to the desired dimensions. The side supporting members are provided with rectangular cut elongated channels 39 extending longitudinally through said members from end to end and they may be straight cut as shown in FIGS. 4 and 5 or angularly cut as shown in FIG. 6 as desired. Likewise, the fuel plates may be either straight as shown in FIG. 4, grooved as shown in FIG. 5, or angled at the edge 40 as shown in FIG. 6. Other types of channels and plates may be used as desired.

The side supporting members 35 are then set into an appropriate holding fixture such as a vacuum chuck in a conventional milling machine (not shown), with one of said chucks being laterally movable. The side supporting members 35 are placed in a facing relation with their respective channels 39 opposite one another and the plates 34 are then slid or otherwise placed in respective pairs of opposing channels. Then the side supporting members are forced toward one another by adjustment of the movable chuck until a completely tight assembly is provided as shown in FIG. 7 with no gaps or spaces between the channels 39 and the edges 40 of the fuel plates 34. After all plates are in position the movable chuck is locked in position.

Next the slides or swage plates 11 are inserted in the water gaps 37 of the assembly and in addition one slide 11 is placed in the space provided under the lowermost or bottom fuel plate 41, in the latter case the slide rests on the bed or surface of the milling machine (not shown). The tapered front portions 15 of the slides 11 facilitate insertion of the slides into the water gaps and the length of the slides is such that their front portions 15 extend beyond the inner or forward end 42 of the fuel assembly while their swage rollers 26 remain outside of the outer or back end 43 as shown in FIG. 8.

Suitable means such as a rod 44 or the like may then be inserted through all of the holes 17 in the slides and interconnected with a suitable power source such as a hydraulic cylinder or the like having a stroke sufficient to pull all of the slides simultaneously to the right as viewed in FIG. 8, through the water gaps to cause the swage rollers 26 to interfere with or engage the metal of the side supporting members 35 and swage the fuel plates into interlocked relation with the side supporting members.

The provision of two swaging rollers 26 on each side 12, 13 of the swage plate 11, with the rollers in the rearward recesses 21 having a greater overhang of their working edges 30 than the forward rollers, is so that the forward rollers may start a relatively shallow impression in the side supporting members 35, thus helping to track the next set of rollers which further upset the metal to form the locking seams for the fuel plates.

As shown in FIGS. 4, 5 and 6 the working edges 30 of the rolls encounter the metal of the side supporting members 35 at a point adjacent the undersurface 44 of the fuel plate 34 overlying the respective swage plate, and the tapered surfaces 31, 32 of the rolls are shaped as shown to cause the interrupted metal to flow upwardly into locking engagement with said undersurface 44.

It is contemplated that swage plates can be constructed having more than two recesses along one or both of its sides and such recesses may provide the same or varying degrees of overhang for the rims of the swage rollers as desired. It is also conceivable that the slides can be fabricated having single rollers on both sides or just one side, the number and disposition of the rollers being one of choice and governed by requirements of the particular situation.

It also may be desirable to have a swage plate with certain of its recesses facing upwardly through the top surface 18 and others facing downwardly through the bottom surface 19, so that rollers may be provided on a single swage plate for swaging metal against the underside of the overlying fuel plate while at the same time also swaging metal against the upper surface of the underlying fuel plate.

In any of the embodiments described above, and perhaps in particular the one having rollers on both the top and bottom surfaces 18, 19, it may be desirable or even necessary from a practical standpoint to provide mechanical means of retaining the rollers 26 in their respective recesses 20, 21. One such means is the set screw 45 shown in FIGS. 2 and 3 which is screwed through the side edge 12 of the swage plate 11 and extends into an annular groove 46 in the lower smaller cylindrical body portion 27 of the swage roller 26. The contact of the inner end 47 of such screw 45 with the roller 26 provides no appreciable frictional resistance which would diminish the rotatability of the roller 26 during use. Any other appropriate standard means may be used to secure the rollers, including the use of magnetized rollers, etc.

Other types of plate-type fuel assemblies may be fabricated in the above fashion. For example, assemblies utilizing transversely curved fuel plates or even those employing concentric cylindrical fuel plates may be fabricated by using a swage plate or slide shaped to fit the particular cooling fluid gaps provided in the assemblies.

As can be seen from the above description, the present invention provides a swage plate device which is easily and quickly assembled and disassembled for use and which provides means for simultaneously swaging all of the fuel plates in a single assembly. The plates of the resulting assembly are tightly locked in the channels of the side supporting members without undesirable gaps or voids and all clearances are reduced to a minimum. The resulting fuel assembly is stronger than those obtained heretofore for the reason that the fuel plates are completely seated in the channels or grooves of the side supporting members.

While certain embodiments of the invention have been shown and described herein, it is to be understood that changes or additions may be made by those skilled in the art. For example, the taper of the forward end of the slide may be omitted and other types of connecting means can be provided other than the hole at the forward end. Furthermore, the swage plates may be pushed through the fuel assembly rather than pulled, or the swage plates may be held in a stationary position and the fuel assembly moved relative thereto in order to achieve the swaging action. These and other alterations may be made without departing from the scope and spirit of this invention.

I claim:
1. A swaging tool for use with spaced stacked nuclear fuel plates having their side edges disposed in parallel slots in side supporting plates comprising a swage plate dimensioned so as to substantially occupy the space bounded by an adjacent pair of said fuel plates and said side plates, said swage plate having a plurality of circular recesses, at least one of said recesses being disposed adjacent each side edge of opposed side edges of said swage plate, each of said recesses overlapping the side edge adjacent thereto of said opposed side edges so as to define an opening along said side edge, a swaging roller rotatably disposed in each of said recesses, said rollers seating flush in said recesses so as not to increase the thickness of said swage plate, each said roller having a laterally extending beveled peripheral rim edge with an arc portion thereof extending beyond the side edge of said plate through said opening.

2. A swaging tool for use with spaced stacked nuclear fuel plates having their side edges disposed in parallel slots in side supporting plates comprising a swage plate dimensioned so as to substantially occupy the space bounded by an adjacent pair of said fuel plates and said side plates, said swage plate having a plurality of stepped circular recesses, at least one of said recesses being disposed adjacent each side edge of opposed side edges of said swage plate, said recesses having upper larger diameter shallow portions and lower smaller diameter concentric deeper portions, said upper portion of each of said recesses overlapping the side edge adjacent thereto of said opposed side edges so as to define an opening along said side edge, a swaging roller rotatably disposed in each of said recesses, each said roller having a cylindrical lower body portion and an upper larger diameter rim portion seating flush in said upper larger diameter recess portion so as not to increase the thickness of said swage plate, each said upper larger diameter rim portion having a beveled rim edge with an arc portion thereof extending beyond the side edge of said plate through said opening.

3. A swaging tool according to claim 2 wherein an equal plurality of swaging rollers is disposed on either side edge so that each succeeding opposed pair of rollers has rim edge arc portions extending further beyond the side edges of said plate through said openings than the preceding opposed pair of rollers.

4. A swaging tool according to claim 2 wherein said rim edges are beveled downwardly.

5. A swaging tool according to claim 2 wherein an equal plurality of swaging rollers is disposed on either side edge and wherein each succeeding opposed pair of rollers has downwardly beveled rim edge arc portions extending further beyond the side edges of said plate through said openings than the preceding opposed pair of rollers.

References Cited in the file of this patent

UNITED STATES PATENTS

| | | |
|---|---|---|
| 164,379 | Kloman | June 15, 1875 |
| 1,374,604 | Peters | Apr. 12, 1921 |
| 1,550,107 | Sheafe | Aug. 18, 1925 |
| 1,785,905 | Kerruish | Dec. 23, 1930 |
| 1,999,434 | Albertson | Apr. 30, 1935 |
| 2,187,661 | Lochrane | Jan. 16, 1940 |
| 2,395,878 | Keene | Mar. 5, 1946 |
| 2,770,032 | Kelly | Nov. 13, 1956 |

FOREIGN PATENTS

| | | |
|---|---|---|
| 147,149 | Germany | Mar. 17, 1903 |
| 705,003 | Germany | Apr. 15, 1941 |